(12) United States Patent
Jöckel et al.

(10) Patent No.: US 11,150,261 B2
(45) Date of Patent: Oct. 19, 2021

(54) RESOLUTION INCREASE IN THE ROTATIONAL SPEED SIGNAL BETWEEN ROTATIONAL SPEED PULSES

(71) Applicant: Continental Teves AG & Co. oHG, Frankfurt (DE)

(72) Inventors: Wolfgang Jöckel, Gersfeld (DE); Timo Dietz, Hochheim am Main (DE); Bernhard Schmid, Friedberg (DE); Roland Hilser, KirchheimTeck (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 274 days.

(21) Appl. No.: 15/433,470

(22) Filed: Feb. 15, 2017

(65) Prior Publication Data

US 2017/0160303 A1    Jun. 8, 2017

Related U.S. Application Data

(63) Continuation of application No. PCT/EP2015/067606, filed on Jul. 30, 2015.

(30) Foreign Application Priority Data

Aug. 15, 2014    (DE) ............... 10 2014 216 295.5

(51) Int. Cl.
   *G01P 3/489*    (2006.01)
   *G01P 3/44*    (2006.01)
   *G01D 5/245*    (2006.01)

(52) U.S. Cl.
   CPC ............ *G01P 3/489* (2013.01); *G01D 5/2451* (2013.01); *G01P 3/44* (2013.01); *B60Y 2300/06* (2013.01); *B60Y 2400/3032* (2013.01)

(58) Field of Classification Search
   CPC . B60Y 2400/3032; G01D 5/2451; G01P 3/44; G01P 3/489
   (Continued)

(56) References Cited

U.S. PATENT DOCUMENTS 4,197,767 A  *  4/1980  Leung ................... F02D 35/023
                                                                    123/179.16
4,255,789 A  *  3/1981  Hartford ............... F02D 41/263
                                                                    123/406.65
(Continued)

FOREIGN PATENT DOCUMENTS

DE            19548385 A1       7/1997
DE            19859227 A1       7/1999
(Continued)

OTHER PUBLICATIONS

International Search Report and Written Opinion dated Apr. 7, 2016 from corresponding International Patent Application No. PCT/EP2015/06606.
(Continued)

*Primary Examiner* — Jeffrey P Aiello

(57) ABSTRACT

A method for producing sensor information depends on a rotational speed, using a rotational speed sensor which is adapted to output rotational speed pulses in predetermined angular positions of a physical sensor field that rotates at the rotational speed. In order to increase resolution, a digital angle signal each is determined between the pulses. A defined number of most significant bits of said angle information is output to determine the rotational speed so that the interval between two pulses is subdivided into a defined number of subintervals. An angle value which can be unambiguously interpreted by means of the sinusoidal signal can be determined from the cosine signal by using two phase shift sinusoidal signals and an arccos function. The device (Continued)

optionally outputs the angle signal below a threshold value and an impulse signal above the threshold value to determine speed.

12 Claims, 7 Drawing Sheets

(58) Field of Classification Search
USPC .............. 324/166, 207.25; 702/145, 147, 151
See application file for complete search history.

(56) References Cited

U.S. PATENT DOCUMENTS

| | | | | |
|---|---|---|---|---|
| 4,450,403 | A | * | 5/1984 | Dreiseitl ................. G01P 3/489 324/165 |
| 4,628,314 | A | | 12/1986 | Morinaga et al. |
| 4,862,365 | A | * | 8/1989 | Onesti ..................... G01D 1/00 701/1 |
| 5,019,773 | A | | 5/1991 | Sugiura et al. |
| 5,299,143 | A | | 3/1994 | Yamagata |
| 6,339,322 | B1 | | 1/2002 | Loreck |
| 6,566,867 | B1 | | 5/2003 | Schroeder |
| 2002/0013674 | A1 | | 1/2002 | Matsubara |
| 2003/0080857 | A1 | * | 5/2003 | Hartmann ............ B60C 23/061 340/425.5 |
| 2004/0066183 | A1 | * | 4/2004 | Lohberg .................. B60T 8/171 324/166 |
| 2006/0052973 | A1 | | 9/2006 | Hiller |
| 2013/0035896 | A1 | | 2/2013 | Ueda et al. |
| 2013/0101065 | A1 | * | 4/2013 | Heim ..................... G08C 15/06 375/295 |
| 2014/0160926 | A1 | * | 6/2014 | Gage .................. H04W 74/0833 370/235 |

FOREIGN PATENT DOCUMENTS

| | | |
|---|---|---|
| DE | 103135518 | 2/2013 |
| EP | 0059244 A2 | 9/1982 |
| FR | 2861458 A1 | 4/2005 |
| JP | S5967458 A | 4/1984 |
| JP | 2001505657 A | 4/2001 |
| WO | 2011129190 A1 | 7/2013 |

OTHER PUBLICATIONS

German Search Report dated Feb. 4, 2015 for corresponding German application No. 10 2014 216 295.5.

Japanese Office Action dated Jan. 10, 2018 for corresponding Japanese application No. 2017-506393.

* cited by examiner

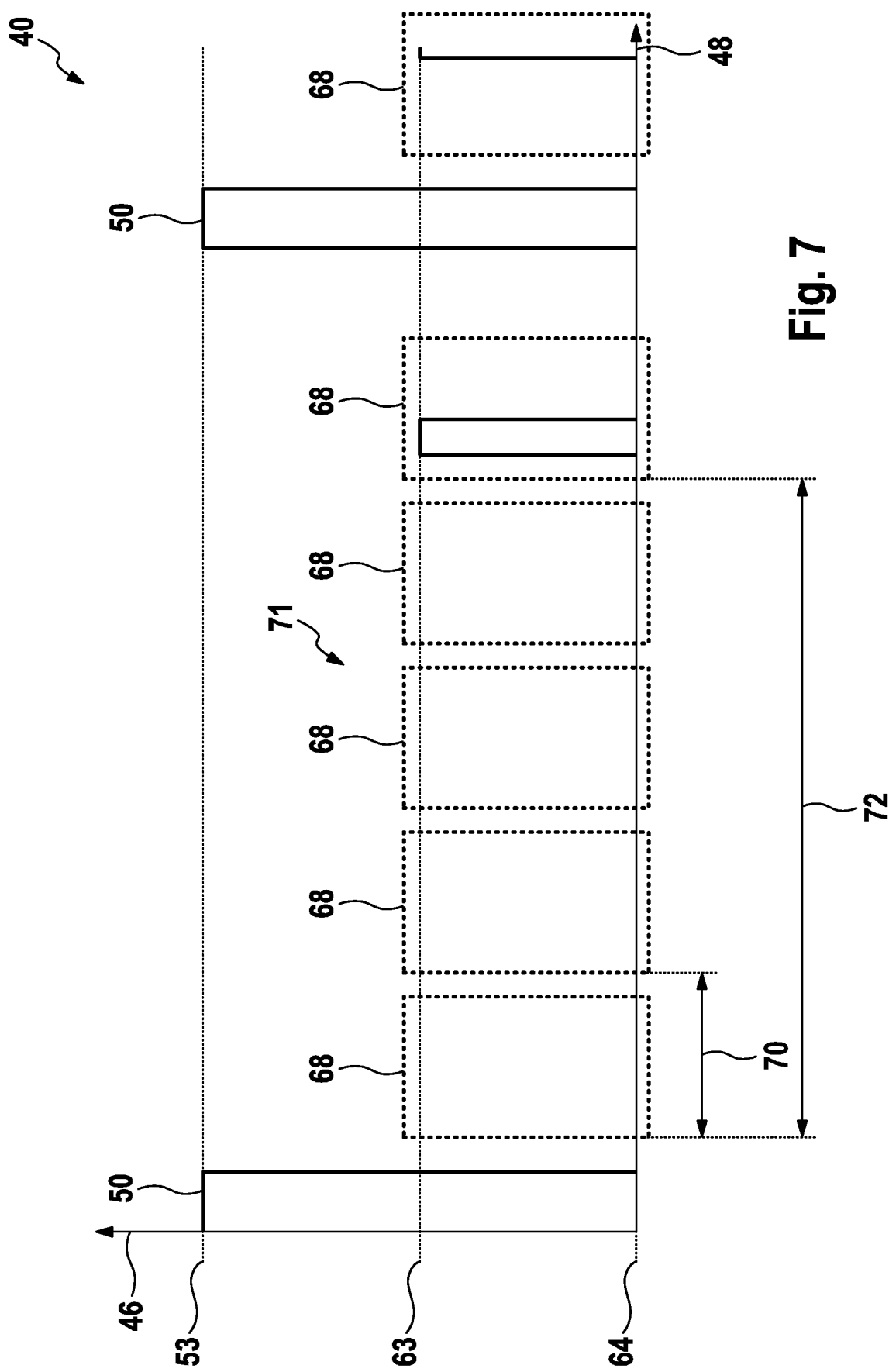

RESOLUTION INCREASE IN THE ROTATIONAL SPEED SIGNAL BETWEEN ROTATIONAL SPEED PULSES

CROSS REFERENCE TO RELATED APPLICATIONS

This U.S. patent application claims the benefit of PCT patent application No. PCT/EP2015/067606, filed Jul. 30, 2015, which claims the benefit of German patent application No. 10 2014 216 295, filed Aug. 15, 2014, both of which are hereby incorporated by reference.

BACKGROUND

The invention relates to a method for generating an item of sensor information, which depends on a rotational speed, using a rotational speed sensor.

DE 10 2011 080 789 A1 discloses a vehicle in which wheel rotational speed sensors for sensing the wheel rotational speed of the individual wheels are installed. These wheel rotational speed sensors are active wheel rotational speed sensors and transmit their measurement data in the form of rotational speed pulses to an evaluation device via a cable as the transmission path.

SUMMARY

A method for generating an item of sensor information depends on a rotational speed, using a rotational speed sensor, which is set up to output rotational speed pulses at predetermined angular positions of a physical transmitter field which rotates at the rotational speed, and comprises the steps of generating a digital angle signal which depends on the angular position of the physical rotating field, and outputting a predetermined number of most significant bits of the digital angle signal as sensor information.

This is based on the consideration that, within the scope of the rotational speed sensors mentioned at the outset, the rotational speed pulses are generated on the basis of the poles of the physical transmitter field. For this purpose, a measuring sensor senses the physical transmitter field and generates the rotational speed pulses if the physical transmitter field drifting past it reaches a predetermined threshold value. However, since the distances between the poles of the physical transmitter field are locally invariable, the rotational speed can be sensed only using the interval of time between the rotational speed pulses. However, this interval of time may be very long in the case of particularly low rotational speeds, as occur during an operation of parking a vehicle, for example. However, a current rotational speed is then also not available for an accordingly long time, which then has an effect on the speed of corresponding control and regulating systems which depend on the rotational speed. This may be critical to safety, in particular in road traffic, for example in the parking operation mentioned above.

Although the number of poles of the transmitter field and therefore the local distance between the poles of the transmitter field could be increased in order to increase the number of rotational speed pulses, yet other information, which could be used for fault diagnosis for example, is intended to be transmitted between the individual rotational speed pulses within the scope of newer data transmission protocols, for example the AK protocol from the working group of the automobile industry which is known per se. If the number of poles of the transmitter field is increased and their local distance with respect to one another is therefore reduced, there might not be sufficient space available in the actual operating range of the rotational speed sensor, that is to say during a journey at normal speed, to transmit the above-mentioned other information between the rotational speed pulses. Furthermore, a correspondingly wide bandwidth would be needed to transmit all rotational speed pulses from the sensor, in particular at higher rotational speeds.

Determining the angular position of the transmitter field is in the direction of rotation as a digital signal, rather than determining rotational speed pulses from the physical transmitter field. Depending on the required accuracy, the remaining bits can be cut off from this digital angle signal after a particular number of most significant bits. This makes it possible to generate any desired number of rotational speed pulses between two poles. If only the most significant bit is transmitted for example, it is possible to distinguish between states which are similar to a rotational speed pulse between two poles of the physical transmitter field as sensor information, like in the rotational speed sensor mentioned at the outset. If the first two most significant bits of the digital angle signal are transmitted, it is already possible to distinguish between four states which are similar to a rotational speed pulse between two poles of the physical transmitter field as sensor information. Accordingly, the number of states similar to a rotational speed pulse which can be distinguished increases with the number of most significant bits transmitted from the digital angle signal.

Rotational speed pulses can then be generated again from the sensor information, like in the rotational speed sensor mentioned at the outset. For example, a rotational speed pulse can be generated whenever the digital state of the sensor information changes, that is to say when at least one of the most significant bits output changes its value. This would have the advantage of not having to make any major technical changes to the receiver of the rotational speed signal output by the rotational speed sensor in order to evaluate the rotational speed signal. The receiver must only know that the number of rotational speed pulses between two poles of the physical transmitter field has increased and it must derive an accordingly lower speed from the rotational speed signal.

Alternatively, the digital state of the sensor information could also be output at fixed intervals of time, in which case the receiver must then compare the change in the sensor information with the fixed intervals of time in order to obtain the rotational speed information. This would have the advantage that an item of rotational speed information which can be clearly evaluated, that is to say a rotational speed of zero, would also be available when the physical transmitter field which actually rotates is stationary. This is because, in the case mentioned at the outset, it would be unclear whether the physical transmitter field is stationary or whether the rotational speed sensor is broken if no rotational speed information were available for a particular time.

In this case, the angle signal can be generated in any desired manner. However, the rotational speed sensor preferably comprises the above-mentioned measuring sensor which is set up to generate a transmitter signal which depends on the angular position of the physical transmitter field, with the result that a sinusoidal transmitter signal is produced during rotation of the physical transmitter field. In this case, the digital angle signal can be generated on the basis of the argument of the sinusoidal transmitter signal. In this case, the argument of the sinusoidal transmitter signal is intended to be understood as meaning a signal which results in the sinusoidal transmitter signal if a sine or cosine is applied to the signal. Conversely, this means that the argument can be determined from the sinusoidal signal by applying the arc sine or arc cosine to the sinusoidal signal, for example.

In one development, the rotational speed sensor comprises a further measuring sensor which is set up to generate a further transmitter signal which depends on the angular position of the physical transmitter field and is complementary to the transmitter signal. In this case, the amplitude of the two transmitter signals can be determined on the basis of the trigonometrical Pythagoras theorem, the sinusoidal transmitter signal can be normalized on the basis of the determined amplitude, and the argument of the sinusoidal transmitter signal can be determined on the basis of the normalized sinusoidal transmitter signal. The advantage of this embodiment is that the amplitude of the transmitter signal is present here even when the physical transmitter field is at a standstill, and the transmitter signal can therefore be immediately normalized to 1 in order to be able to apply trigonometrical inverse functions to the transmitter signal.

In an additional development, the argument is determined by applying an arc cosine to the sinusoidal transmitter signal, outputting the argument as a digital angle signal if the argument is less than 180°, and outputting an argument, to which 180° have been applied, as a digital angle signal if the argument is greater than 180°. Although the argument could also be determined using the arc sine, the cosine is clearly reversible over the first 180°, with the result that only a case distinction is needed to determine the angle signal over a full 360° rotation. Therefore, the practice of determining the argument using the arc cosine is technically the most simple to implement.

The determination of whether the argument is greater than or less than 180° can be carried out in any desired manner, in principle, for example using the gradient of the sinusoidal transmitter signal, because a cosine function falls below 180° and rises above 180°. However, the sign can be read most quickly from the complementary sinusoidal transmitter signal because this is known to represent the derivative of the sinusoidal transmitter signal and it is therefore immediately clear from the sign whether the transmitter signal is rising or falling. When interpreting the signs, it is only necessary to pay attention to whether the complementary sinusoidal transmitter signal leads or lags the actual transmitter signal.

The direction of rotation can be determined from the angle signal, in particular if it has been determined in the manner mentioned above, earlier and over shorter travel distances with the vehicle since, whereas the angle signal and therefore the sensor information is rising in one direction of rotation, the angle signal and therefore the sensor information is falling in the other direction of rotation.

In one development, the sensor information is intended to be adaptively output in the manner described above since a large number of items of sensor information in relatively large rotational speed ranges could interfere with the transmission of other information, for example data relating to fault states, as already explained. Therefore, the sensor information is intended to be output only if the rotational speed determined on the basis of the rotational speed pulses falls below a predetermined value. If the predetermined value is exceeded, the rotational speed pulses can be output in the conventional manner.

According to another aspect of the invention, a control apparatus is set up to carry out one of the stated methods.

In one development of the stated control apparatus, the stated apparatus has a memory and a processor. In this case, one of the stated methods is stored in the memory in the form of a computer program and the processor is provided for the purpose of carrying out the method when the computer program has been loaded into the processor from the memory.

According to another aspect of the invention, a computer program comprises program code means for carrying out all steps of one of the stated methods when the computer program is executed on a computer or one of the stated apparatuses.

According to another aspect of the invention, a computer program product contains program code which is stored on a computer-readable data storage medium and carries out one of the stated methods when it is executed on a data processing device.

According to another aspect of the invention, a rotational speed sensor for sensing a rotational speed comprises a transmitter element for outputting a physical transmitter field which rotates at the rotational speed, a measuring sensor which is arranged in a stationary manner with respect to the transmitter element and is intended to output a transmitter signal which depends on the physical transmitter field, and one of the stated control apparatuses.

In one particular development, the stated rotational speed sensor is a wheel rotational speed sensor.

According to another aspect a vehicle comprises one of the stated wheel rotational speed sensors.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7 shows a graph having an alternative output signal from the wheel rotational speed sensor from FIG. 2.

DETAILED DESCRIPTION

Figure 1:
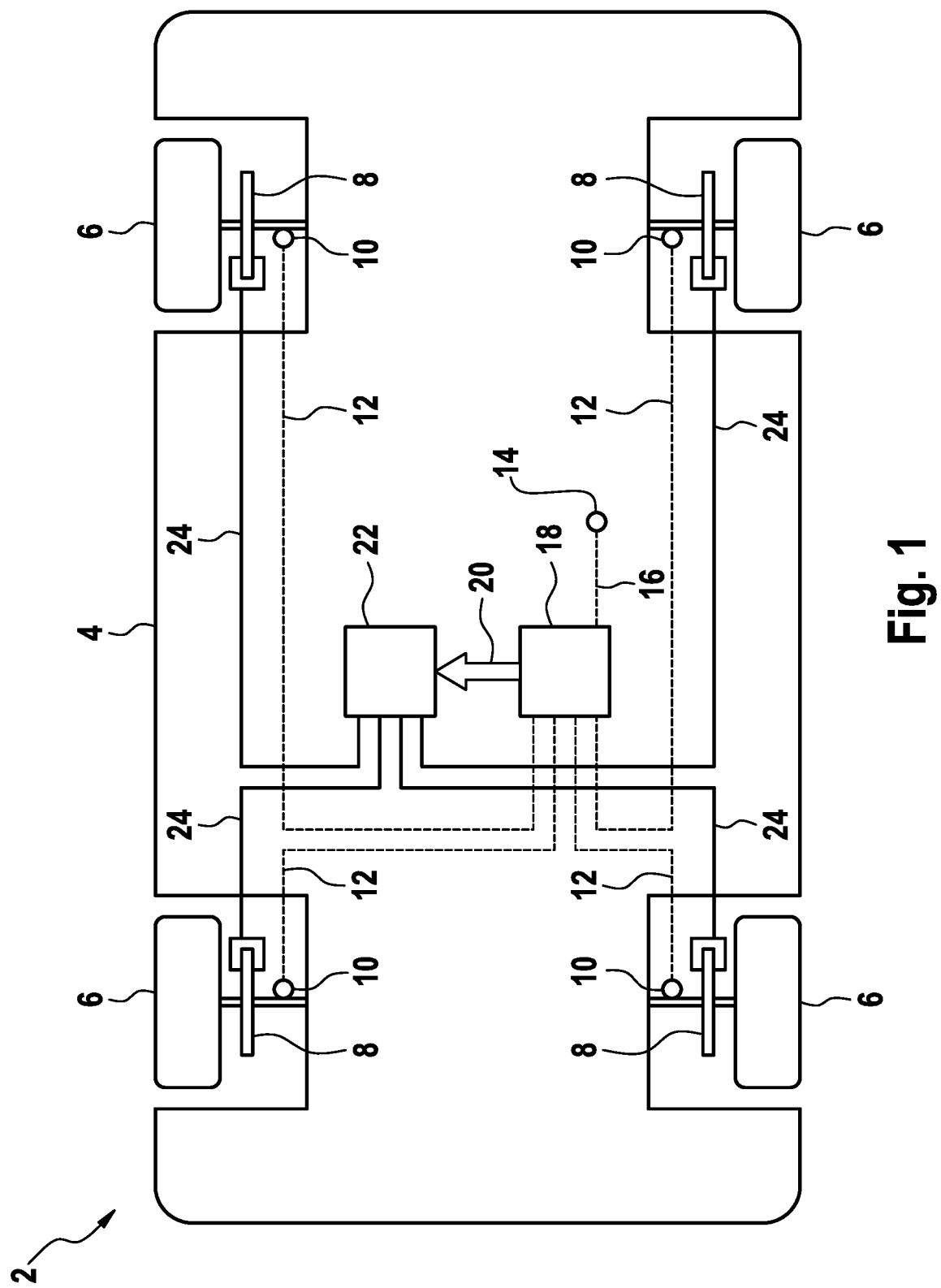
FIG. 1 shows a schematic view of a vehicle having a vehicle dynamics control system.

In the figures, identical technical elements are provided with identical reference symbols and are described only once. Reference is made to FIG. 1 which shows a schematic view of a vehicle 2 having a vehicle dynamics control system.

The vehicle 2 comprises a chassis 4 and four wheels 6. Each wheel 6 can be decelerated with respect to the chassis 4 via a brake 8 fastened to the chassis 4 in a stationary manner in order to decelerate a movement of the vehicle 2 on a road (not illustrated any further).

In this case, it may happen, in a manner known to a person skilled in the art, that the wheels 6 of the vehicle 2 lose their traction and the vehicle 2 even moves away from a trajectory, which is predefined using a steering wheel (not shown any further) for example, as a result of understeering or oversteering. This is avoided by means of control circuits such as ABS (anti-lock braking system) and ESP (electronic stability program).

In the present embodiment, the vehicle 2 has rotational speed sensors 10 on the wheels 6 for this purpose, which sensors sense a rotational speed 12 of the wheels 6. The vehicle 2 also has an inertial sensor 14 which captures vehicle dynamics data 16 relating to the vehicle 2, which data may comprise, for example, a pitch rate, a roll rate, a yaw rate, a transverse acceleration, a longitudinal acceleration and/or a vertical acceleration output in a manner known to a person skilled in the art.

On the basis of the sensed rotational speeds 12 and captured vehicle dynamics data 16, an evaluation apparatus in the form of a controller 18 can determine, in a manner known to a person skilled in the art, whether the vehicle 2 is sliding on the road or even deviates from the predefined trajectory mentioned above and can accordingly react to this with a controller output signal 20. The controller output signal 20 can then be used by an actuating device 22 to activate actuators, such as the brakes 8, by means of actuating signals 24, which actuators react to the sliding and the deviation from the predefined trajectory.

In addition to using the rotational speeds 12 from the individual rotational speed sensors 10 in a vehicle dynamics control system described above, the rotational speeds 12 are also used for other applications. One of these applications is, for example, the determination of the ground speed of the vehicle 2. This speed can then be displayed for the driver or can be used for control purposes, for example when automatically parking the vehicle 2 in a parking space.

Figure 2:
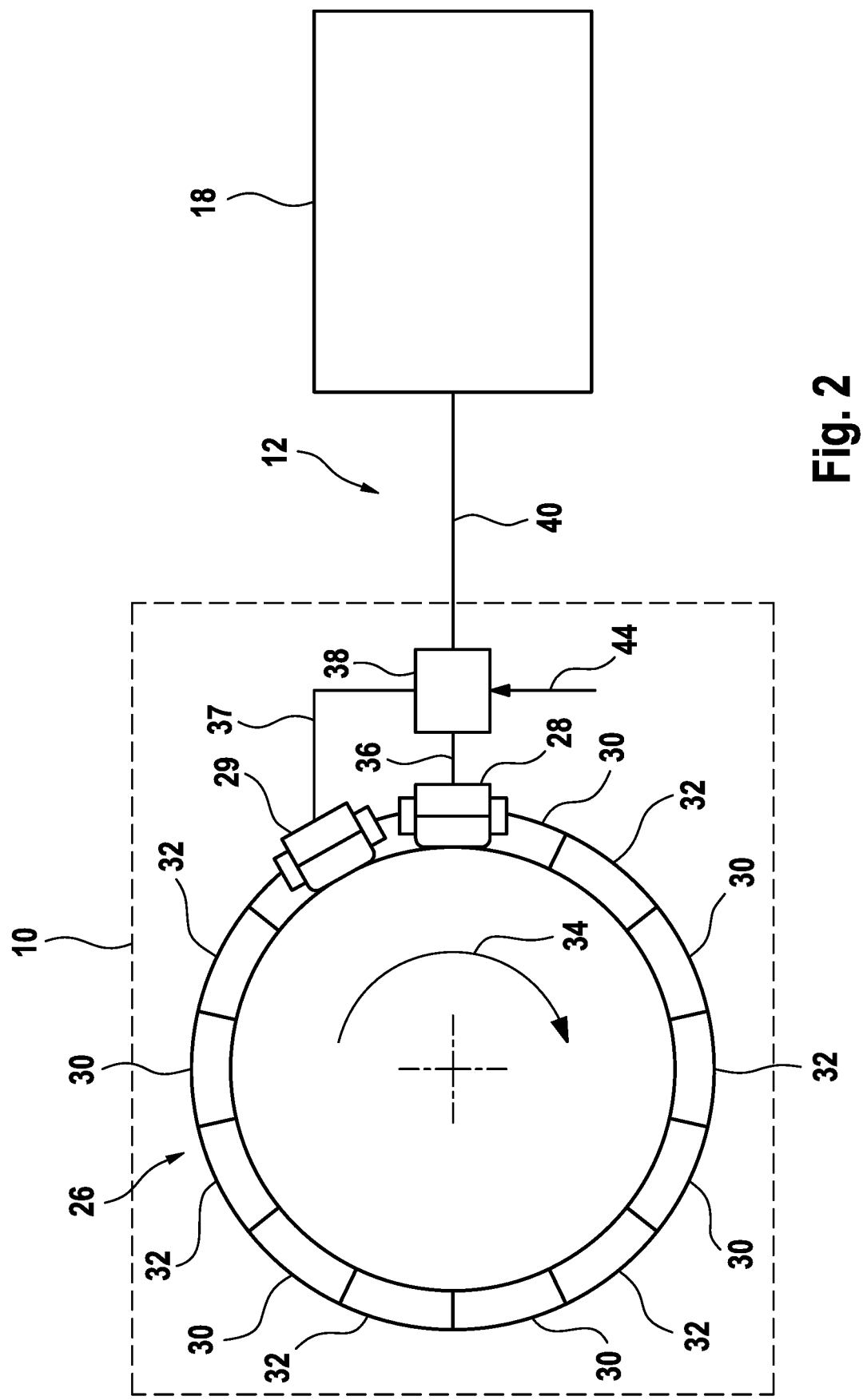
FIG. 2 shows a schematic view of a wheel rotational speed sensor in the vehicle from FIG. 1.

Reference is made to FIG. 2 which shows a schematic view of one of the rotational speed sensors 10 in the vehicle dynamics control system from FIG. 1.

In the present embodiment, the rotational speed sensor 10 is in the form of an active rotational speed sensor which comprises an encoder disk 26, which is fastened to the wheel 6 in a rotationally fixed manner, and two measuring sensors which are fastened in a stationary manner with respect to the chassis 4 and are in the form of a first reading head 28 and a second reading head 29 with a position which is offset with respect to the first reading head.

In the present embodiment, the encoder disk 26 consists of magnetic North poles 30 and magnetic South poles 32 which are strung together and together excite a transmitter magnetic field (not illustrated any further). If the encoder disk 26 fastened to the wheel 6 rotates with the latter in a direction of rotation 34, the transmitter magnetic field thus concomitantly rotates.

The reading heads 28, 29 may comprise magnetostrictive elements which are constructed within the scope of barber pole technology and linearly change their electrical resistance on the basis of the angular position of the transmitter magnetic field excited by the encoder disk 26.

In order to sense the rotational speed 12, the change in the angular position of the encoder disk 26, and therefore the change in the electrical resistances of the reading heads 28, 29, is sensed. For this purpose, the reading heads 28, 29 may comprise a resistance measuring circuit (not illustrated any further), for example a bridge circuit, to which the magnetostrictive elements are accordingly connected. A periodic output signal, called rotational speed transmitter signal 36, 37 below, is generated in the resistance measuring circuit for each reading head 28, 29 on the basis of the electrical resistances of the magnetostrictive elements of the reading heads 28, 29. In a manner which is yet to be described, a pulse signal 40 which depends on the rotational speed 12 and is shown in FIG. 3 can be generated in a signal preprocessing circuit 38 downstream of the reading heads 28, 29 on the basis of the rotational speed transmitter signal 36, 37 and can be output to the controller 18.

Figure 4:
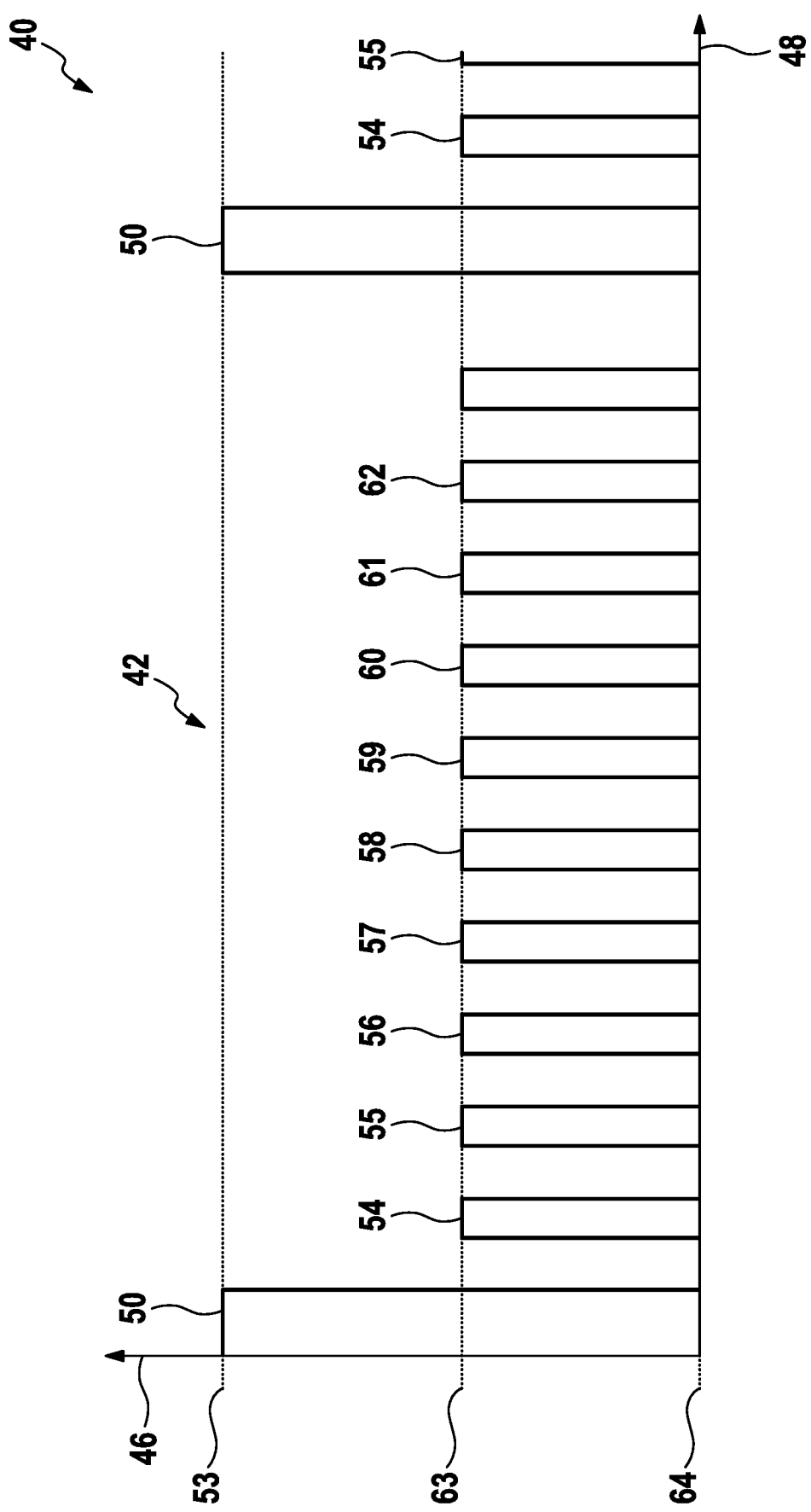
FIG. 4 shows a graph having an output signal from the wheel rotational speed sensor from FIG. 2.

In the present embodiment, in addition to the information relating to the rotational speed 12, an item of state information 42 which is shown in FIG. 4 and can be used to transmit more detailed information relating to the rotational speed 12 can also be entered in the pulse signal 40 as a data transmission signal. This state information 42 may be, for example, the direction of rotation of the wheel 6, for which the rotational speed 12 is sensed, and can be determined in the signal preprocessing circuit 38.

Figure 3:
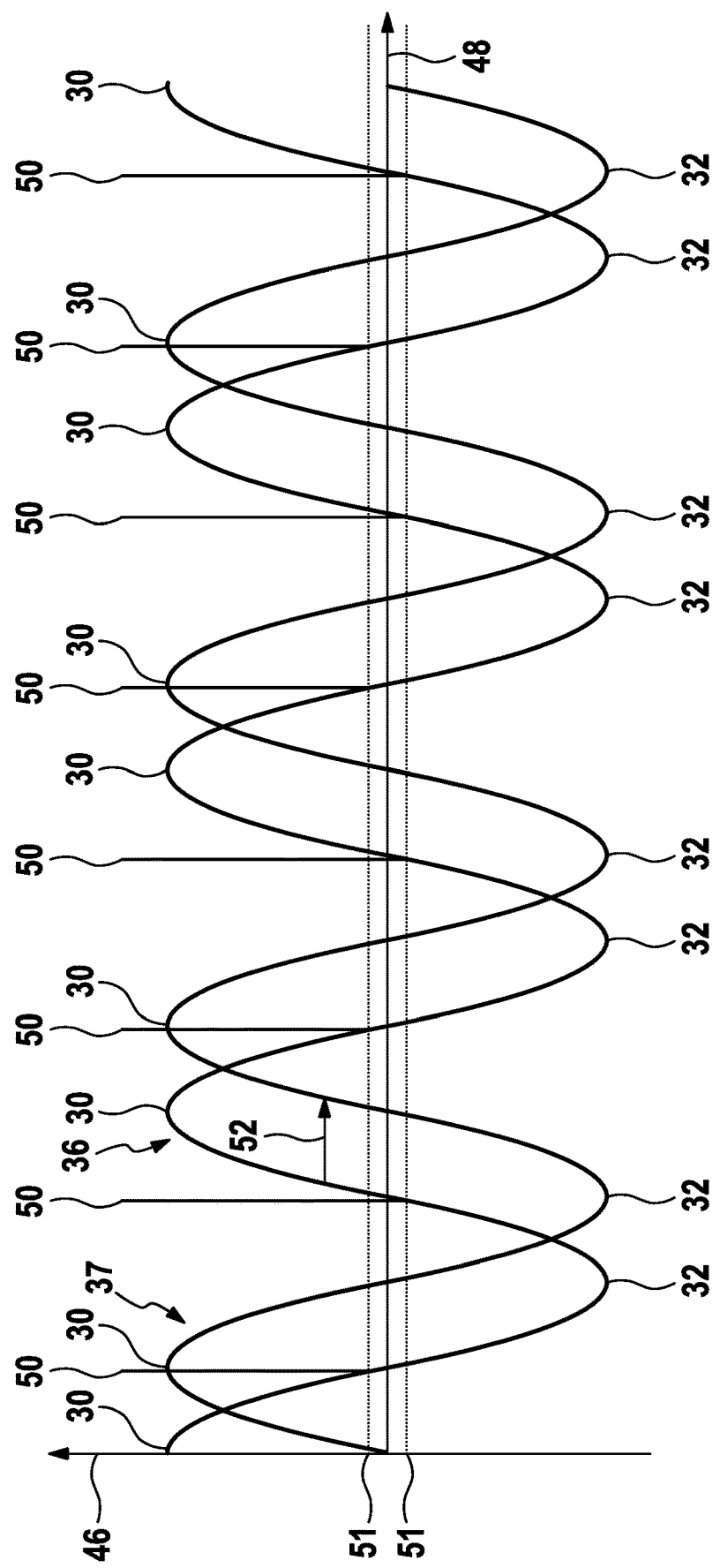
FIG. 3 shows a graph having an output signal from two measuring sensors of the wheel rotational speed sensor from FIG. 2.

Reference is made to FIG. 3 which illustrates the rotational speed transmitter signals 36, 37 in the form of signal values 46 against the time 48. These signal values are generally voltage values.

The profile of the electrical resistance of the magnetostrictive elements mentioned above is clearly identifiable from the example of the first rotational speed transmitter signal 36. A magnetic North pole 30 of the encoder disk 26 is axially below the first reading head 28 at each maximum of the first rotational speed transmitter signal 36, whereas a magnetic South pole 32 of the encoder disk 26 is axially below the first reading head 28 at each minimum of the first rotational speed transmitter signal 36. If the encoder disk 26 rotates, the first rotational speed transmitter signal 36 oscillates between the two extreme values.

The second rotational speed transmitter signal 37 has exactly the same structure as the first rotational speed transmitter signal 36. However, since the second reading head 29 is arranged in a manner offset with respect to the first reading head 28, as seen in the direction of rotation 34 of the encoder disk 26, the magnetic poles 30, 32 reach the second reading head 29 before or after the first reading head 28 in terms of time depending on the direction of rotation 34 of the encoder disk 26. Therefore, the second rotational speed transmitter signal 37 either leads or lags the first rotational speed transmitter signal 36.

In order to sense the rotational speed 12, the number of oscillations of at least one of the two rotational speed transmitter signals 36, 37 can be counted during a predetermined period since, the higher the rotational speed 12, the more oscillations are generated in this predetermined period.

Figure 5:
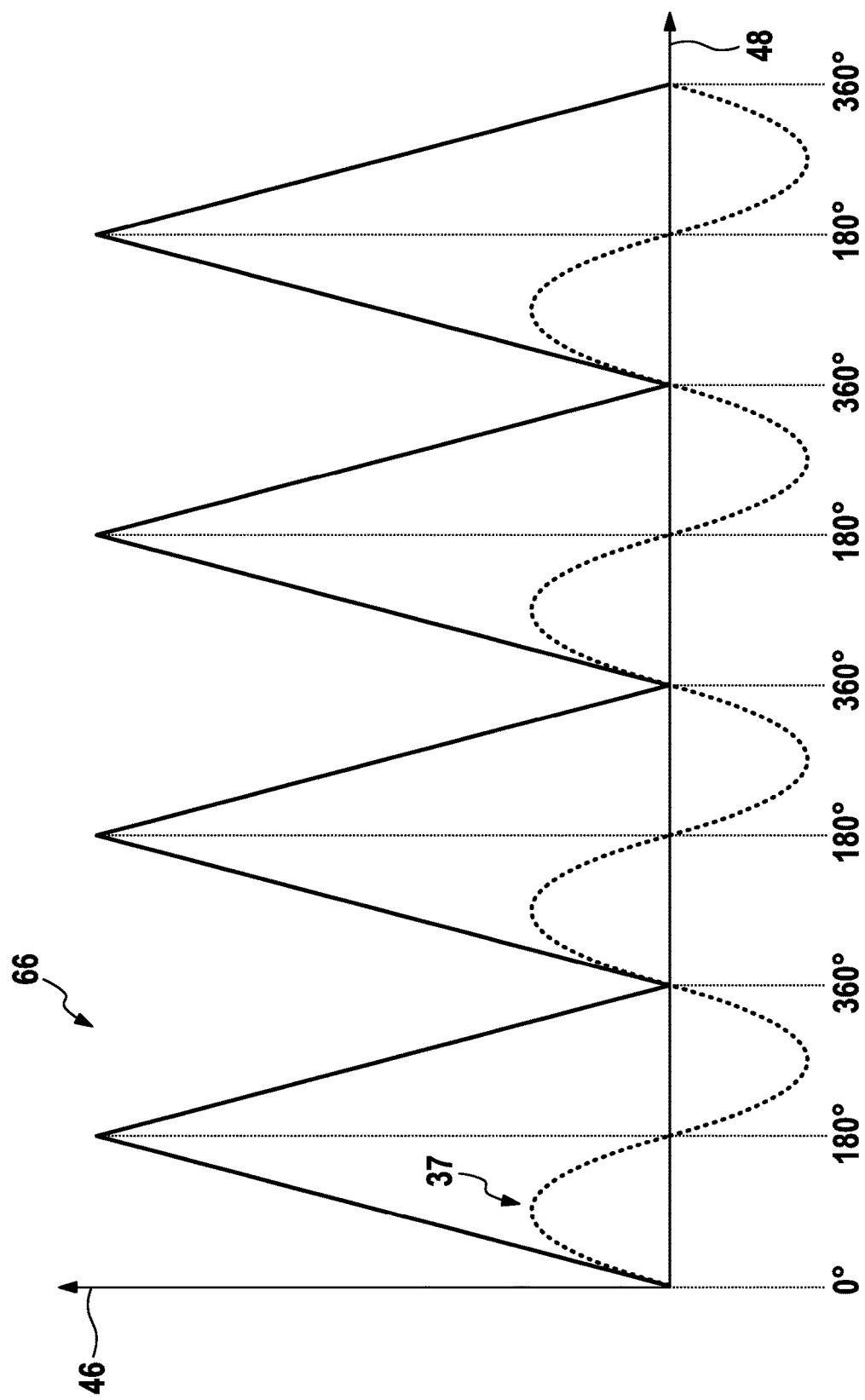
FIG. 5 shows a graph having an angle signal which is determined in a signal preprocessing circuit of the wheel rotational speed sensor from FIG. 2.

In order to simplify the data transmission effort between the rotational speed sensor 10 and the device receiving the rotational speed, for example the controller 18, only the pulse signal 40, rather than the data-intensive rotational speed transmitter signals 36, 37, is transmitted, which pulse signal comprises pulses 50 which are shown in FIGS. 4 and 5 and are called speed pulses 50 below. Each speed pulse 50 therefore shows the occurrence of an oscillation or possibly a half-oscillation. Thresholds 51 can be introduced in order to generate the speed pulses 50. In principle, a single threshold 51 which can be set to a signal value 46 of zero suffices. If, for example, the first rotational speed transmitter signal 36 passes through the threshold 51 of zero, a speed pulse 50 can be generated.

However, since the reading heads 28, 29 are constructed using barber pole technology, there is the risk of additional low-amplitude oscillations being superimposed on the rotational speed transmitter signals 36, 37, which is known under the technical term flipping. These would double the frequency of the rotational speed transmitter signals 36, 37 and therefore the rotational speed 12 to be measured. In order to exclude this, a threshold 51 shown in FIG. 4 is respectively inserted above and below the signal value 46 of zero within the scope of the present embodiment, a speed pulse 50 being generated if the first rotational speed transmitter signal 36 intersects the upper threshold 51 from top to bottom and intersects the lower threshold 51 from bottom to top.

In addition, the direction of rotation 34 of the encoder disk 26 and therefore the rotational speed 12 can be derived from the sign of the phase offset 52 between the first and second rotational speed transmitter signals 36, 37 for the reasons mentioned above.

Reference is made to FIG. 4 which illustrates the pulse signal 40 again in the form of signal values 46 against the time 48. These signal values are generally current values.

The pulse signal 40 carries the speed pulses 50 with a first pulse level 53 which is called a high pulse level 53 below. These speed pulses 50 are transmitted to the superordinate device, such as the controller 18, with the highest priority, which means that, in the case of the pending transmission of a speed pulse 50, the transmission of all other information is postponed or aborted.

In addition to the speed pulses 50, the above-mentioned state information 42 is also entered in the pulse signal 40 with at least one further information pulse 54 to 62 which, depending on the information to be transmitted, may have, for example, a second pulse level 63, which is called a medium pulse level 63 below, or a third pulse level 64, which is called a low pulse level 64 below. For the sake of clarity, all information pulses 54 to 62 are illustrated with the medium pulse level 63 in FIG. 3. In the present embodiment, nine information pulses 54 to 62 are entered in the pulse signal 40 after the speed pulse 50, which information pulses carry information based on the AK protocol from the working group of the automobile industry which is known per se. In this case, each information pulse 54 to 62 carries one bit #0 to #8. If an information pulse 54 to 62 is transmitted with the medium pulse level 63, its corresponding bit #0 to #8 is set to 1. If an information pulse 54 to 64 is transmitted with the low pulse level 64, its corresponding bit #0 to #8 is set to 0. The AK protocol has conventionally already been used to monitor an air gap (not visible any further in FIG. 2) between the encoder disk 26 and the reading heads 28, 29, the individual information pulses 54 to 62 having been assigned in the following manner:

| Bit | Pulse | Abbreviation | Description | Coding |
| --- | --- | --- | --- | --- |
| #0 | 54 | LR | Air gap reserve | '0' = OK |
|  |  |  |  | '1' = poor |
| #1 | 55 |  |  |  |
| #2 | 56 |  |  |  |
| #3 | 57 | GDR | Direction of rotation information validity | '0' = invalid '1' = valid |
| #4 | 58 | DR | Direction of rotation 34 | '0' = positive '1' = negative |
| #5 | 59 |  |  |  |
| #6 | 60 |  |  |  |
| #7 | 61 |  |  |  |
| #8 | 62 | P | Parity |  |

It was already explained further above how the direction of rotation 34, for example, is determined for the bit #4.

The devices downstream of the rotational speed sensor 10, for example the controller 18, are therefore provided with more detailed information relating to the rotational speed 12 and its determination, for example the direction of rotation 34, on the basis of the state information 42.

However, the problem with the above-mentioned transmission of the rotational speed 12 with the pulse signal 40 is that, in the case of very low rotational speeds 12, as occur when parking the vehicle 2 for example, only insufficient speed pulses 50 are transmitted to the controller 18 because no speed pulses 50 are generated and transmitted on account of the slow rotation of the encoder disk 26 over a comparatively long period. No current rotational speed 12 is then available either in this period. This may result in unacceptable delays, in particular in the case of parking assistants or similar applications.

For this reason, it is proposed, within the scope of the present embodiment, to adaptively change the generation and transmission of the information relating to the rotational speed 12 below a particular speed threshold. The decision as regards which method is used to generate and transmit the rotational speed 12 could be made by the signal preprocessing circuit 38, for example on the basis of the speed of the vehicle 2. The changed method itself can also be carried out by the signal preprocessing circuit 38, for example, and shall be explained in more detail below using FIGS. 5 to 7.

The two reading heads 28, 29 are arranged in such a manner that the two rotational speed transmitter signals 36, 37 are complementary to one another, that is to say they have a phase offset of 90° with respect to one another.

The amplitude A can then first of all be determined from the two rotational speed transmitter signals 36, 37 on the basis of the trigonometrical Pythagoras theorem. If a signal value 46 of the first rotational speed transmitter signal 38 is denoted using X and a signal value 46 of the second rotational speed transmitter signal 37 is denoted using Y, the amplitude can be calculated as follows within the scope of the trigonometrical Pythagoras theorem:

$$A=\sqrt{X^2+Y^2}$$

Once the amplitude A is known, the two rotational speed transmitter signals 36, 37 can be normalized to 1. For a more comprehensible description of the embodiments below, the first rotational speed transmitter signal 36, which leads the second rotational speed transmitter signal 37 in the manner shown in FIG. 3, can be handled like a cosine signal and the second rotational speed transmitter signal 37 can be handled like a sine signal. Within the scope for generating and transmitting the information relating to the rotational speed 12, an arc cosine is now applied to the first rotational speed transmitter signal 36. In comparison with the arc sine, the arc cosine has the advantage that it is bijective over the first 180° and therefore requires fewer case distinctions. The result is an intermediate signal 66, the signal values 46 of which are illustrated against the time 48 in FIG. 5.

In contrast to the first rotational speed transmitter signal 36, the signal values 46 of the intermediate signal 66 run in a linear manner over time 48. In addition, the angular position of the encoder disk 26 can also be discerned, in principle, from the intermediate signal 66. However, the change in the intermediate signal 66 over time 48 must be considered for this purpose since, if the intermediate signal 66 rises, the position of the encoder disk 26 is between 0° and 180° and, if the intermediate signal 66 falls, the position of the encoder disk 26 is between 180° and 360°. However, the problem is that the information for the rotational speed 12 is intended to be determined in a state of the vehicle 2 in which the rotational speed 12, and therefore also the intermediate signal 66, scarcely changes over time 48. The position of the encoder disk 26 must therefore also be able to be discerned when only one signal value 46 is available for the intermediate signal 66, because it does not change over time.

The second rotational speed transmitter signal 37 which is complementary to the first rotational speed transmitter signal 36 can be used in a particularly favorable manner for this purpose because it represents the differential quotient for the signal values 46 of the first rotational speed transmitter signal 36 in a manner known per se and therefore represents the change in the first rotational speed signal 36 over time 48. If the two rotational speed transmitter signals 36, 37 are considered as a cosine and sine in the manner mentioned above, the intermediate signal 66 rises when the second rotational speed transmitter signal 37 is positive and falls when the second rotational speed transmitter signal 37 is negative. In order to illustrate this, the second rotational speed transmitter signal 37 is indicated again for the sake of clarity using dotted lines in FIG. 5.

Figure 6:
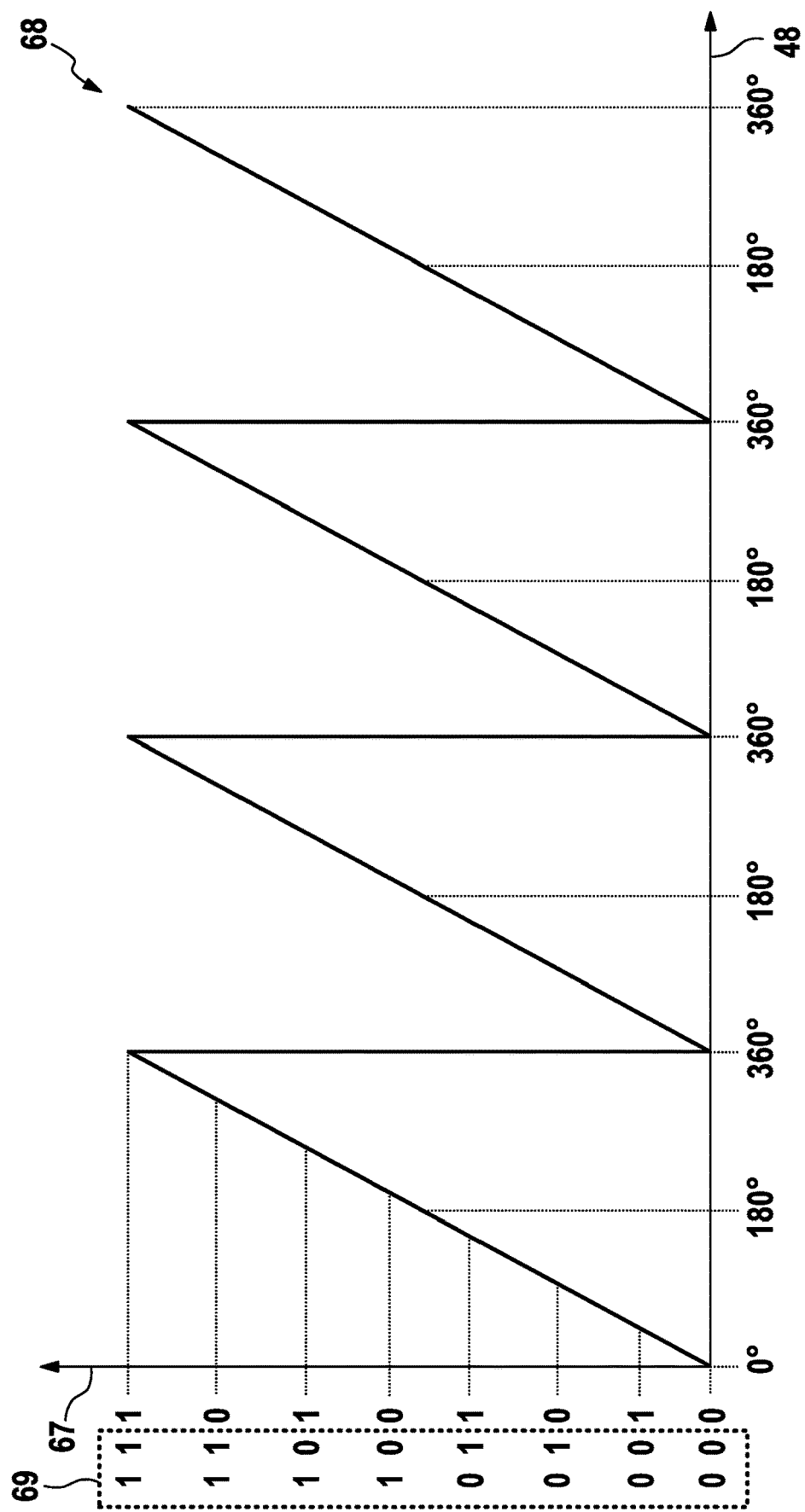
FIG. 6 shows a graph having an expanded angle signal which is determined in a signal preprocessing circuit of the wheel rotational speed sensor from FIG. 2.

Since the position of the encoder disk 26 can now also be determined if the first rotational speed transmitter signal 36 does not change over time, it is possible to generate an angle signal 68 from which the position of the encoder disk 26 over time 48 can be directly discerned. For this purpose, the intermediate signal 66 is immediately output as an angle signal 68 when the second rotational speed transmitter signal 37 is positive. When the second rotational speed transmitter signal 37 is negative, a value of 360° minus the signal value 46 of the intermediate signal 66 is output as the angle signal 68. The angle signal 68 should be in the form of a digital signal which is indicated in FIG. 6 and is described by digital values 67 over time 48. In this case, the axis containing the digital values 67 is labeled only with 3-bit intermediate values in FIG. 6, whereas the digital angle signal 66 can naturally have a far higher resolution.

In order to now generate the above-mentioned information relating to the rotational speed 12 from this digital angle signal 68, the most significant bits, which are framed with dotted lines in FIG. 6 and are indicated using the reference symbol 69, are cut out from the digital values 67 of the angle signal 68 as information relating to the rotational speed 12 in the pulse signal 40.

These most significant bits 69 can then be transmitted in any desired manner in the pulse signal 40. An example of this is indicated in FIG. 7.

In this case, the most significant bits 69 of a current digital value 67 of the angle signal 68 are transmitted at regular intervals of time 70 between the actual rotational speed pulses 50 instead of or in addition to the state information 42 as sensor information 71. Within the scope of FIG. 7, the sensor information 71 is transmitted instead of the state information 42. The receiver of this information relating to the rotational speed 12, that is to say the controller 18, can derive the total time 72 between a state change of the most significant bits 69 of the angle signal 68 and therefore the rotational speed 12 from the known intervals of time 70.

However, the transmission of the speed pulses 50 is ultimately optional. Alternatively, the speed pulses 50 could also be replaced with the most significant bits 69, in which case an accordingly large amount of effort in the receiver of the information relating to the rotational speed 12, that is to say the controller 18, would then be needed to decode the information.

The information relating to the rotational speed 12 generated in the manner described above and transmitted in the pulse signal 40 allows the receiver of the information relating to the rotational speed 12 to also directly discern the direction of rotation 34 of the encoder disk 26 from the state change of the most significant bits 69 in the pulse signal 40 since the direction of rotation 34 of the encoder disk 26 can also be clearly distinguished by a rise or fall in the digital values 67 of the angle signal 68 which are described with the most significant bits 69.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A method of generating sensor information of a rotational speed sensor coupled to a wheel of a vehicle, the method comprising:
   generating a transmitter signal in sinusoidal form of a first measuring sensor of the rotational speed sensor, the transmitter signal corresponding to angular positions of a physical transmitter field generated by an encoder disk of the rotational speed sensor based on rotation of the wheel of the vehicle detected by the first measuring sensor;
   generating a complementary transmitter signal in sinusoidal form complementary to the transmitter signal of a second measuring sensor of the rotational speed sensor, the complementary transmitter signal corresponding to the angular positions of the physical transmitter field generated by the encoder disk of the rotational speed sensor based on the rotation of the wheel of the vehicle detected by the second measuring sensor;
   generating a digital angle signal based on an argument of the transmitter signal and the complemtentary transmitter signal; and
   outputting a predetermined number of most significant bits of the digital angle signal as the sensor information,
   wherein the complementary transmitter signal has a first sign when the argument of the transmitter signal is less than 180° and a second opposing sign when the argument of the transmitter signal is greater than 180°.

2. The method of claim 1, wherein generating the digital angle signal comprises:
   determining a first amplitude of the transmitter signal and a second amplitude of the complementary transmitter signal;
   normalizing the transmitter signal based on the first amplitude; and
   determining the argument of the transmitter signal based on the normalized sinusoidal transmitter signal.

3. The method of claim 2, wherein generating the digital angle signal further comprises:

determining the argument of the transmitter signal by applying an arc cosine to the transmitter signal;

outputting the argument of the transmitter signal as the digital angle signal if the argument of the transmitter signal is less than 180°; and outputting the argument of the transmitter signal, to which 180° is applied, as the digital angle signal if the argument of the transmitter signal is greater than 180°.

4. The method of claim 1, further comprising:

determining a direction of rotation of the physical transmitter field based on a gradient of the digital angle signal.

5. The method of claim 1, further comprising:

determining rotational speed pulses of a pulse signal based on the transmitter signal and the complementary transmitter signal, wherein the outputting comprises outputting the predetermined number of most significant bits of the digital angle signal as the sensor information if a rotational speed of the wheel determined based on the rotational speed pulses falls below a predetermined value.

6. The method of claim 5, further comprising outputting the rotational speed pulses if the rotational speed exceeds the predetermined value.

7. A rotational speed sensor comprising:

an encoder disk configured to generate a physical transmitter field corresponding to a rotational speed of a wheel of a vehicle;

a first measuring sensor arranged in a stationary manner with respect to the encoder disk, the first measuring sensor configured to output a transmitter signal in sinusoidal form corresponding to angular positions of the physical transmitter field;

a second measuring sensor arranged in a stationary manner with respect to the encoder disk, the second measuring sensor configured to output a complementary transmitter signal in sinusoidal form complementary to the transmitter signal corresponding to angular positions of the physical transmitter field; and a controller configured to:

generate a digital angle signal based on an argument of the transmitter signal and the complementary transmitter signal, and outputting a predetermined number of most significant bits of the digital angle signal as the sensor information, wherein the complementary transmitter signal has a first sign when the argument of the transmitter signal is less than 180° and a second opposing sign when the argument of the transmitter signal is greater than 180°.

8. The rotational speed sensor of claim 7, wherein the controller is configured to:

determine a first amplitude of the transmitter signal and a second amplitude of the complementary transmitter signal, normalize the transmitter signal based on the first amplitude, and determine the argument of the transmitter signal based on the normalized sinusoidal transmitter signal.

9. The rotational speed sensor of claim 8, wherein the controller is configured to:

determine the argument of the transmitter signal by applying an arc cosine to the transmitter signal;

output the argument of the transmitter signal as the digital angle signal if the argument of the transmitter signal is less than 180°; and outputting the argument of the transmitter signal, to which 180° is applied, as the digital angle signal if the argument of the transmitter signal is greater than 180°.

10. The rotational speed sensor of claim 7, wherein the controller is configured to determine a direction of rotation of the physical transmitter field based on a gradient of the digital angle signal.

11. The rotational speed sensor of claim 7, wherein the controller is configured to determine rotational speed pulses of a pulse signal based on the transmitter signal and the complementary transmitter signal and output the predetermined number of most significant bits of the digital angle signal as the sensor information when if a rotational speed of the wheel determined based on the rotational speed pulses falls below a predetermined value.

12. The rotational speed sensor of claim 11, wherein the controller is further configured to output the rotational speed pulses if the rotational speed exceeds the predetermined value.

* * * * *